M. MICHAJLOV.
ARTIFICIAL LIMB.
APPLICATION FILED MAR. 1, 1919.
1,320,022.
Patented Oct. 28, 1919.
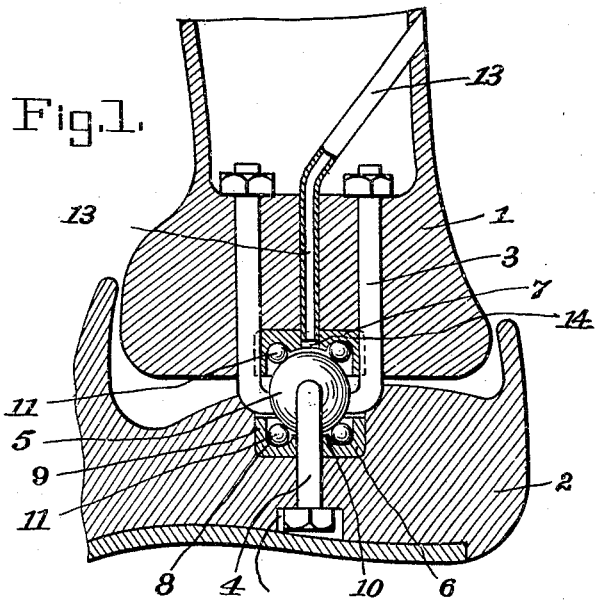
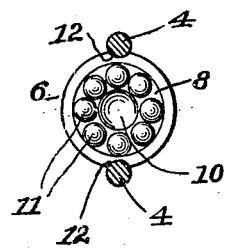
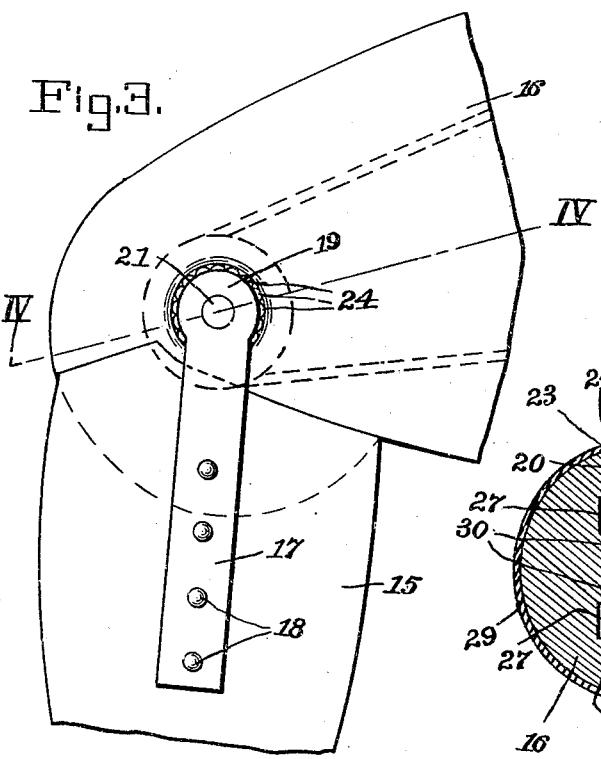
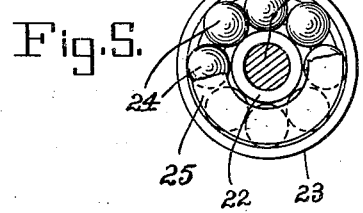
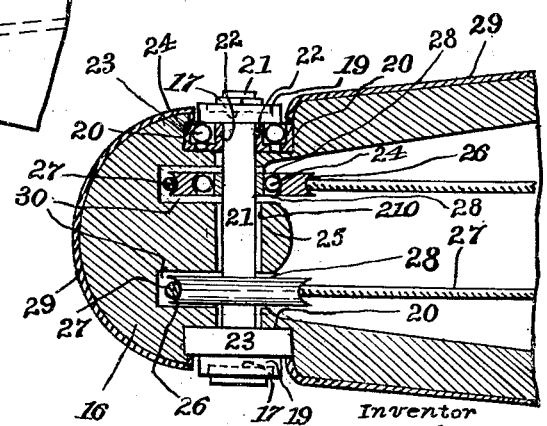
Inventor
Mita Michajlov,
By Frederick V. Winters
Attorney.

UNITED STATES PATENT OFFICE.

MITA MICHAJLOV, OF NEW YORK, N. Y.

ARTIFICIAL LIMB.

1,320,022. Specification of Letters Patent. Patented Oct. 28, 1919.

Application filed March 1, 1919. Serial No. 280,060.

*To all whom it may concern:*

Be it known that I, MITA MICHAJLOV, a citizen of the United States, and resident of New York, in the county and State of New York, have invented certain new and useful Improvements in Artificial Limbs, of which the following is a full, clear, and exact specification.

This invention relates to artificial limbs, and has for its object to improve the construction and operation of the joints by applying ball bearings thereto in the special manner hereinafter described. A special object is to apply ball bearings to the universal joint which connects the ankle section of the limb to the foot section and to also provide means for lubricating said joint and bearings. A further object is to apply ball bearings to the knee joint and also mount the pulleys or sheaves for the suspender cords on ball bearings.

The invention will be first hereinafter described in connection with the accompanying drawings which constitute part of this specification, and then more specifically defined in the claims at the end of the description.

In the accompanying drawings, wherein similar reference characters are used to designate corresponding parts throughout the several views:—

Figure 1 is a section through the ankle and foot of an artificial limb, showing the ball bearings and lubricant supplying passage applied to the universal joint connecting said parts.

Fig. 2 is a plan view of the lower casing for the ball bearings shown in Fig. 1, the lower U-shaped member of the universal joint being shown in section with its arm engaging grooves in the sides of said casing.

Fig. 3 is an elevation of a knee joint taken from one side.

Fig. 4 is a section taken on the line IV—IV of Fig. 3, and showing two of the sets of ball bearing casings in section and the other two in elevation, and Fig. 5 is a side elevation of one of the ball bearing casings shown in Fig. 4, a part of the ball retainer being broken away.

Referring first to Figs. 1 and 2, and especially to Fig. 1, the ankle part of an artificial limb is shown at 1 and the foot part at 2, said parts being connected by a universal joint comprising an upper U-shaped member 3, secured to the ankle part, a lower U-shaped member 4 secured to the foot part, and a spherical member 5 universally connecting said U-shaped members together. Two sets of ball bearings 11 are applied to said spherical member 5, one set below the same and carried by the foot part, and the other set above said spherical member and carried by the ankle part.

The lower set of ball bearings is arranged in an annular groove 8 in a casing 6 which is seated in the foot part 2 immediately below the spherical member 5. An annular wall or flange 9 around the outer edge of the groove 8 extends up above the ball bearings 11 and effectively retains them in position, as in a cage, when the joint is assembled as shown in Fig. 1. The central portion of the casing or cage 6 is made concavo-spherical, as at 10, Fig. 2, to conform to the surface of the spherical member 5, but said central portion 10 is spaced slightly away from said member 5, as seen in Fig. 1.

The upper set of ball bearings is arranged in an annular groove formed in a casing 7 similarly formed as the casing or cage 6 just described only inverted so as to overlie the spherical member 5 and occupying a recess in the ankle part 1. Said casing or cage 7 has an opening 14 through its center into which a tube 13 extends from an external point on the ankle part. A lubricant is designed to be inserted or forced through said tube 13 and discharged upon the spherical member 5 and into the lower casing or cage 6 which will act as a reservoir for retaining a quantity of the lubricant which may be oil, vaseline, or the like. The U-shaped members 3 and 4 preferably have their arms engaged with vertical grooves 12 in the outer edges of the casings or cages 6 and 7, as shown in Figs. 1 and 2, in order to prevent said casings or cages from rotating.

Referring now to Figs. 3, 4 and 5, the lower and upper members of the knee joint of an artificial limb are indicated at 15 and 16, respectively. The lower member 15 has straps 17 secured thereto by rivets 18 and provided with hinge collars 19 preferably offset inwardly at their free ends to enter cavities 20 in the member 16. Through said hinge collars and an enlarged bore 210 in said member 16 a hinge pintle or shaft 21 is passed. Retained in the cavities 20 by the collars 19 are ball bearings 24 arranged in sets between inner rings 22, which fit snugly around the shaft 21, and outer rings 23 which are fitted in the cavities. The ball bearings may be held together in sets by any common form of retainer 25, Fig. 5.

Also mounted around the shaft 21 in the cavities 30 formed interiorly of the part 16 are a plurality, preferably two, sheaves or pulleys 26 over which the suspension cords 27 are passed. These sheaves carry sets of ball bearings and are formed like the rings 22 and 23 of the cages already described except that the outer rings are grooved to form the sheaves 26, as will be readily understood. The cavities 30 for said sheaves are, of course, left open on the inside of the part 16 to permit free passage of the cords 27 and for the admission of a lubricant, as at 28, from the interior of the limb. A covering 29 of suitable material is secured over the limb member 16, as shown in Fig. 4, the edges of said covering being turned into the cavities 20 so as to overlap the outer rings of the ball bearing cages but leaving space around the collars 19 for the introduction of a lubricant to the ball bearings from the outside of the limb, as clearly indicated in Fig. 3.

Having thus described my invention, what I claim as new and desire to secure by Letters Patent of the United States is:—

1. The combination with an ankle-joint for artificial limbs, including U-shaped members connected to the ankle and foot parts of the limb, and a spherical universal joint member connecting said U-shaped members together, of ball bearing cages disposed between the arms of said U-shaped members above and below said spherical member, and sets of ball bearings in said cages in contact with said spherical member.

2. The combination with an ankle joint for artificial limbs, including U-shaped members connected to the ankle and foot parts of the limb, and a spherical universal joint member connecting said U-shaped members together, of ball bearing cages disposed between the arms of said U-shaped members above and below said spherical member, sets of balls in said cages in contact with said spherical member, and means for positioning said cages relative to the arms of said U-shaped members to prevent rotation of the cages.

3. The combination with an ankle joint for artificial limbs, including a spherical universal joint member, of ball bearing cages arranged above and below said spherical member, each cage having an annular raceway for the ball bearings and a concavo-spherical central portion conforming to the adjacent surface of the spherical member, and balls in said raceway engaging the spherical member.

4. The combination with a knee joint for artificial limbs, including a hinge pintle, there being cavities in one part of the limb surrounding said pintle, of ball bearing cages comprising inner rings fitted around said pintle, and outer rings fitted in said cavities, and ball bearings between said rings.

5. The combination with a knee joint for artificial limbs, including a hinge pintle, of sheaves for suspending cords journaled on said pintle.

6. The combination with a knee joint for artificial limbs, including a hingle pintle, of sheaves for suspending cords journaled on said pintle, and ball bearings interposed between said sheaves and pintle.

7. The combination with the upper and lower members of a knee joint for artificial limbs, of hinge collars connected to one member, the other member having cavities in its surface into which said collars extend, a pintle passed through said collars and said other member of the joint, and ball bearings fitted in said cavities around the pintle and on the inner faces of the collars.

8. The combination with the upper and lower members of a knee joint for artificial limbs, of hinge collars connected to one member, the other member having cavities in its surface into which said collars extend, a pintle passed through said collars and said other member of the joint, ball bearings fitted in said cavities around the pintle and on the inner faces of the collars, and a covering for the member having the cavities, said covering being turned into the cavities to overlap the ball bearings but leaving space for introducing lubricant thereto from the outside of the limb.

In testimony whereof I have signed my name to this specification.

MITA MICHAJLOV.

Copies of this patent may be obtained for five cents each, by addressing the "Commissioner of Patents, Washington, D. C."